United States Patent [19]

Gonsalves

[11] Patent Number: 5,589,011
[45] Date of Patent: Dec. 31, 1996

[54] NANOSTRUCTURED STEEL ALLOY

[75] Inventor: Kenneth E. Gonsalves, Storrs, Conn.

[73] Assignee: The University of Connecticut, Storrs, Conn.

[21] Appl. No.: 389,778

[22] Filed: Feb. 15, 1995

[51] Int. Cl.$^6$ .............................. C22C 38/22; C22C 38/24
[52] U.S. Cl. ............................. 148/334; 148/325; 75/246
[58] Field of Search ................................. 148/320, 334, 148/304, 403, 325; 75/246

[56] References Cited

U.S. PATENT DOCUMENTS

| | | | |
|---|---|---|---|
| 5,149,381 | 9/1992 | Grewe et al. | 148/403 |
| 5,328,500 | 7/1994 | Beltz et al. | 75/343 |
| 5,352,266 | 10/1994 | Erb et al. | 75/300 |
| 5,433,797 | 7/1995 | Erb et al. | 148/304 |

OTHER PUBLICATIONS

Jacques van Wonterghem et al, "Formation of a Metallic Glass by Thermal Decompositon of $Fe(Co)_5$", Jul. 22, 1985, vol. 55, No. 4, Physical Letter Reviews; pp. 410–413.

Jacques van Wonterghem et al, "Formation of ultra–fine amorphous alloy particles by reduction in aqueous solution", Aug. 1986, Nature vol. 322; pp. 622–623.

K. Gonsalves et al, "Synthesis of Advanced Ceramics and Intermetallics From Organometallic/Polymeric Precursors", Jul. 5, 1988, Solid State Ionics, 32/33, pp. 661–668.

K. E. Gonsalves et al, "Synthesis and Processing of Nanostructured M50 Type Steel", NanoStructured Materials, vol. 4, No. 2. 1994; pp. 139–147.

Tongsan D. Xiao et al, "Synthesis of Aluminum Nitride/ Boron Nitride Composite Materials", Journal of the American Ceramic Society, vol. 76, No. 4, Dec. 18, 1992; pp. 987–992.

Akihisa Inoue et al, "Formation of Ultra–Fine Amorphous Powders in Fe–M–B (M=18 Transition Metal) Systems by Chemical Reduction Method and Their Thermal and Magnetic Properties", Metallurgical Transactions A, vol. 19A, Sep. 1988 pp. 2315–2318.

Eugène Papirer et al, "The Preparation of Ferrofluid by Decomposition of Disobalt Octacarbonyl", Journal of Colloid and Interface Science, vol. 94; No. 1, Jul. 1983, pp. 220–228.

Thomas W. Smith et al, "Colloid Iron Dispersions Prepared via the Polymer–Catalyzed Decomposition of Iron Pentacarbonyl", J. Phys. Chem. 1980, 84, pp. 1621–1629.

J. C. Parker et al, "Optical Determination of the Oxygen Stoichiometry of Nanophase Metal–Oxide Materials", NanoStructured Materials, vol. 1, pp. 53–57 1992.

R. D. Shull et al, "Nanocomposite Magnetic Materials", NanoStructured Materials, vol. 1, pp. 83–88, 1992.

L. E. McCandlish et al, "Processing and properties of NanoStructured WC–Co", NanoStructured Materials, vol. 1, pp. 119–124, 1992.

G. M. Chow et al, "Chemical Precipitation and Properties of Nanocrystalline Fe–Cu Alloy and Composite Powders", NanoStructured Materials, vol. 1, pp. 361–368, 1992.

K. E. Gonsalves et al, "Synthesis of Si(C, N) nanoparticles by rapdi laser polycondensation/crosslinking reactions of an organosilazane precursor", Journal of Materials Science 27 (1992), pp. 3231–3238.

(List continued on next page.)

Primary Examiner—Deborah Yee
Attorney, Agent, or Firm—Fishman, Dionne & Cantor

[57] ABSTRACT

A nanostructured steel alloy is presented. Preferably, the nanostructured steel is of the M50 type, and comprises iron, molybdenum, chromium, vanadium and carbon. In accordance with an important feature of this invention, the grain size of the steel is in the nanometer range. In accordance with the method of the present invention, the nanostructured steel is prepared via chemical synthesis from iron, molybdenum, chromium and vanadium starting materials. Decomposition of metal precursors or reduction of metal halides is followed by consolidation of the resulting nanostructured steel powders into bulk steel. The nanostructured steel of this invention finds particular utility in the manufacture of cutting tools and bearings.

21 Claims, 3 Drawing Sheets

OTHER PUBLICATIONS

T. D. Xiao et al, *"Synthesis of Si(N, C) nanostructured powders from an organometallic aerosol using a hot–wall reactor"*, Journal of Materials Science 28 (1993), pp. 1334–1340.

R. W. Siegel, "Nanostructured Materials —Mind Over Matter—", NanoStructured Materials, vol. 4, No. 1, pp. 121–138, 1994.

H. Gleiter, *"Materials with Ultrafine Microstructures: Retrospectives and Perspectives"*, NanoStructured Materials vol. 1, pp. 1–19, 1992.

Kehsin Kuo, *"Carbides in Chromium, Molybdenum, and Tungsten Steels"*, Journal of the Iron and Steel Institute, pp. 363–375; Apr. 1953.

Keshin Kuo, *"Carbide Precipitation, Secondary Hardening, and Red Hardness of High–Speed Steel"*, Journal of the Iron and Steel Institute, pp. 223–228; Jul. 1953.

J. Edwin Bridge, Jr. et al, *"Carbides in M–50 High Speed Steel"*, Metallurgical Transactions, vol. 2, Aug. 1971 pp. 2209–2214.

Francis Kayser et al, *"Carbides in High Speed Steel—Their Nature and Quantity"*, Metal Process, Jun. 1952, pp. 79–85.

NANOSTRUCTURED STEEL ALLOY

BACKGROUND OF THE INVENTION

This invention relates generally to nanostructured steel and a method of making the same. More particularly, this invention relates to nanostructured M50 type steel synthesized by chemical methods, which has improved mechanical and physical properties such as hardness, strength and durability.

Metals and alloys are traditionally produced by melting and casting techniques which entail some level of microstructural and chemical inhomogeneities. Recent developments in rapid solidification techniques, such as powder atomization and melt spinning, are capable of producing chemically homogeneous materials with fine microstructures. Grain sizes in micrometers are achievable by rapid solidification techniques. The microstructural refinement is usually accompanied by enhanced mechanical and physical properties. In recent years, much attention has been devoted to a further reduction of grain size from the micrometer size to the nanometer. Nanostructured materials have superior mechanical, magnetic, and other physical properties.

Iron-based alloys are technologically important materials in modern industry. For example, M50 steel (4.0%Cr, 4.5%Mo, 1.0%V, 0.8%C, with balance of Fe), because of its good resistance to tempering, wear and rolling contact fatigue, has been used extensively in the aircraft industry as main-shaft bearings in gas-turbine engines. In the hardened condition, M50 steel consists of a body-centered tetragonal martensite phase and a dispersion of carbide particles including $M_{23}C_6M_6C$, $M_2C$ and MC. The grain size of the martensite is about 0.032 mm and smaller, and some of the dispersion particles are several microns in diameter. These relatively large carbide particles often act as fatigue crack initiation sites. A nanostructured M50 steel would not contain these large carbide particles. Furthermore, a nanostructured M50 steel may have improved resistance to tempering, and wear and rolling contact fatigue.

Techniques for the production of nanostructured materials include electrolytic deposition, chemical or vapor deposition, mechanical alloying and chemical synthesis. Chemical synthesis is advantageous in that it allows tailored synthesis through assembly of atomic or molecular precursors, allows control of stoichiometry, allows mixing of constituent phases at the molecular level, and provides for faster, cost-effective production of bulk quantities of materials.

Examples of the chemical synthesis of ultrafine iron and iron-cobalt alloys have been described in U.S. Pat. No. 4,842,641 issued to Gonsalves; by Jaques van Wonterghem et al in an article entitled "Formation of a Metallic Glass by Thermal Decomposition of $Fe(CO)_5$," in *Physical Review Letters*, Vol. 55, No. 4, pages 410–413 (1985); by Jaques van Wonterghem et al in an article entitled "Formation of Ultrafine Amorphous Alloy Particles by Reduction in Aqueous Solution" in *Nature*, Vol. 322, pages 622–623 (1986); and by Kenneth E. Gonsalves and Kuttaripalyam T. Kembaiyan in an article entitled "Synthesis of Advanced Ceramics and Intermetallics From Organometallic/Polymeric Precursors" in *Solid State Ionics*, 32/33, pages 661–668 (1989). However, there are no previous reports of the chemical synthesis of a multicomponent commercial nanostmctured M50 steel.

SUMMARY OF THE INVENTION

The above-discussed and other disadvantages and deficiencies of the prior art are overcome or alleviated by the nanostructured steel alloy of the present invention. Preferably the steel alloy is M50 type steel, comprising iron, chromium, molybdenum, vanadium and carbon. In accordance with an important feature of the present invention, the particle size of the steel is in the nanometer range. In accordance with the method of the present invention, the nanostructured steel is obtained by chemical synthesis. Nanostructured steel powders are formed by decomposition of the appropriate metal precursors or reduction of the appropriate metal halides, followed by consolidation of the nanostructured powders into bulk steel.

The nanostructured steel of the present invention offers many features and advantages, including enhanced hardness, strength and durability. Chemical synthesis provides enhanced control over composition and stoichiometry, as well as faster and more cost-effective production of bulk quantities of materials. The nanostructured steel of this invention finds particular utility when used as a material in bearings, such as beatings used in the aircraft industry, and in cutting tools.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE EMBODIMENT

Figure 1:
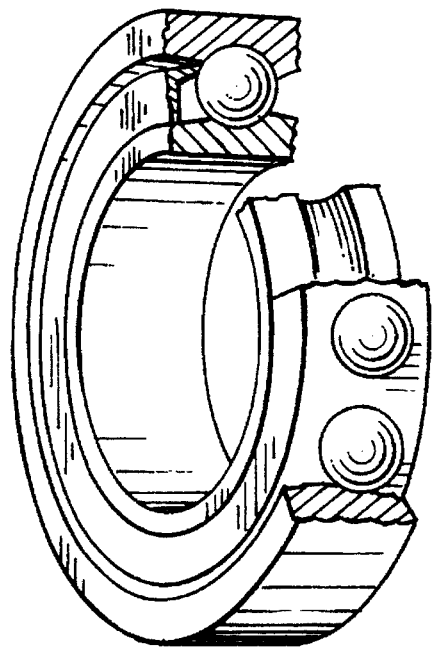
FIG. 1 is a perspective view of a bearing.

The nanostructured steel alloy of the present invention comprises iron, chromium, molybdenum, vanadium and carbon. In accordance with an important feature of this invention, the particle size of the nanostructured steel is in the nanometer range. In a first embodiment of the invention, the steel alloy is of the M50 type, comprising iron in the range from about 80 to about 95 weight percent, chromium and molybdenum each from about 2 to about 8 weight percent, vanadium about 1 to about 3.4 weight percent, and carbon from about 0.1% to about 8% of the total composition. Preferably, the nanostructured steel is M50 steel, comprising iron in the amount of 89.7 weight percent, chromium in the amount of 4 weight percent, molybdenum in the amount of 4.5 weight percent, vanadium in the amount of 1 weight percent and carbon in the amount of 0.8 weight percent of the total composition.

In accordance with a second embodiment of the invention, the alloy comprises iron in the amount of 94.2 weight percent, chromium in the amount of 0.3 weight percent, molybdenum in the amount of 0.4 weight percent, vanadium in the amount of 2.1 weight percent and carbon in the amount of 3 weight percent of the total composition.

The nanostructured steel alloys are manufactured by consolidation (compression) of nanostructured steel powders. The nanostructured steel powders are obtained via chemical synthesis, either by decomposition of the appropriate metal precursors, or reduction of the appropriate metal halides, or a combination of these methods.

Suitable metal precursors include, but are not limited to, metal carbonyls and bis(ethylbenzene) metal complexes. Decomposition of metal starting materials may be accomplished with an effective amount of heat or ultrasound, in solution or as an aerosol, or by a combination of those. Suitable inert solvents include, but are not limited to decalin. A surfactant may be used to prevent agglomeration of the metal particles, including but not limited to polyoxyethylene—Sorbitan trioleate.

Suitable metal halides include, but are not limited to, metal chlorides and bromides. Suitable reducing agents include, but are not limited to, sodium borohydride in an aqueous solvent, and sodium triethylborohydride in an anhydrous solvent such as toluene. Where co-precipitation is very rapid with concomitant formation of large amounts of hydrogen gas, the reaction process should be slowed, for example by cooling.

The nanostructured powders as obtained are further heat treated with forming gas (4% hydrogen or pure hydrogen gas) at 400° C.–600° C. for 2–4 hours, depending on the sample size. The nanostructured powders as obtained are extremely pyrophoric. Thus, deoxygenated solvents are used in their synthesis and the reactions are carried out under a stream of argon. The powders are also stored under mineral oil for surface protection.

Preferably, to retain the nanostructure, consolidation (compaction) is at low temperatures, in the range from about 400° C. to about 800° C. at 230 MPa for periods ranging between 15–30 minutes.

Referring now to FIG. 1, the nanostructured steel alloy of the present invention may be used as a bearing shown generally at 10.

Figure 2:
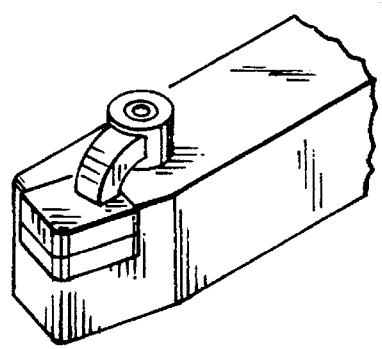
FIG. 2 is a perspective view of a cutting tool.

Referring now to FIG. 2, the nanostructured steel alloy of the present invention may be used for a cutting tool as shown generally at 12.

The following examples are provided to illustrate further the scope of the present invention; however, they should not be construed to be limitations thereof.

Materials and Methods

Iron pentacarbonyl, $Fe(CO)_5$, molybdenum carbonyl, $Mo(CO)_6$, chromium carbonyl, $Cr(CO)_6$, vanadium carbonyl, $V(CO)_6$, bis(ethyl benzene) chromium, $Cr(CH_3CH_2C_6H_5)_2$, bis(ethyl benzene) molybdenum, $Mo(CH_3CH_2C_6H_5)_2$, iron chloride hexahydrate, $FeCl_3.6H_2O$, chromium chloride hexahydrate, $CrCl_3.6H_2O$, molybdenum chloride hexahydrate, $MoCl_3.6H_2O$, and sodium borohydride, $NaBH_4$, (Strem Chemical Co.) were used as received.

Elemental analysis was performed using energy dispersive analysis x-ray (EDAX).

Transmission electron microscope (TEM) observations were carried out with a Hitachi H9000 uHR microscope.

Scanning electron microscope (SEM) observations were carried out with a JEOL 6400 microscope with EDS and WDS attachments. Specimens for observation were prepared by mechanical grinding, with final mechanical polishing carried out using alumina of about 01. micrometers.

High resolution transmission electron microscope (HRTEM) observations were carried out with a JEOL 4000 EX microscope, with an acceleration voltage of approximately 5000 volts for the ion machine and a carrier gas of argon. Specimens were initially polished with a dimple grinder, and finally prepared with an ion beam instrument, obtaining a final specimen thickness on the order of 30 micrometers.

Prior to consolidation (compaction), nanostructured powders were outgassed at 650° C. for 8 hours, until a vacuum of $10^{-4}$ torr was reached, to decompose and remove mineral oil on the particle surface. Consolidation was carried out using a vacuum hot press (VHP). The as-synthesized alloy powders were transferred to a cylindrical steel die with a 17.7 mm diameter cavity in a dry-box. Prior to the transfer of the powders from the storage tube, the glove-box was evacuated and flushed with argon several times and then backfilled with argon to near ambient pressure. The die was filled with powder to a height of 32 mm after manual tapping and pressing in the glove-box. The filled die was enclosed in a plastic bag while still in the glove box, and then transported to a vacuum hot press. The powder was then compressed at 230 MPa for 16 minutes, followed by cooling in the press.

EXAMPLE 1

39.66 grams of $Fe(CO)_5$ (0.2008 mol), 1.54 grams of $Mo(CO)_6$ (0.0096 mol), 2.12 grams of $Cr(CO)_6$ (0.0059 mol), and 0.535 gram of $V(CO)_6$ (0.0025 mol) were dispersed in dry decalin (200 ml), in a one liter 3-neck flask equipped with a magnetic stirrer, a water cooled condenser, gas inlet and outlet tubes connected to a mercury check valve. The flask was placed in an oil bath and heated. (To ensure the uniform mixing of the starting compounds and complete decomposition of these carbonyls, solid crystals of these carbonyls as well as the liquid $Fe(CO)_5$ were first dispersed in decalin, followed by thermal decomposition into metallic powders.) The stirred solution was refluxed under argon at 80° C. for 10 hours. It was then heated to 160° C. for another 10 hours in an argon stream until decomposition of the carbonyls was completed, as evidenced by the formation of shiny black metallic powders. After cooling to near ambient temperature, decalin was removed via vacuum distillation, leaving a residue of black powders. These powders were next coated with deoxygenated mineral oil for further handling, and stored under argon in a Schlenk flask.

EXAMPLE 2

Iron pentacarbonyl (liquid) was mixed with vanadium carbonyl (solid), bis(ethylbenzene)chromium (liquid) and bis(ethylbenzene)molybdenum (liquid) in dry decalin. The mixture was maintained under an inert atmosphere of argon and stirring using an overhead mechanical stirrer at 140° C. for 12 hours and then at 180° C. for another 14 hours. At the end of this period, the reaction was complete as evidenced by the formation of a colorless liquid layer of decalin over the shiny black metal particles. The solvent was removed under reduced pressure, approximately 2 torr at 90° C. and the residue stored under argon.

EXAMPLE 3

As in Examples 1 and 2, except that an ultrasonic probe was used to decompose the precursor metal carbonyls. Here the resulting black powder was obtained by filtering the solution in a glove-box followed by washing with dry pentane. The powders were then stored under argon in a Schlenk flask.

EXAMPLE 4

$FeCl_3.6H_2O$, $CrCl_2.6H_2O$, and $MoCl_3.6H_2O$, were dissolved in deoxygenated water (500 ml) in the desired molar proportions, in a one liter 3-neck flask placed in an ice bath. The flask was equipped with gas inlet and outlet tubes, and a magnetic stir bar. The gas outlet tube was connected to a mercury check valve. Sodium borohydride ($NaBH_4$) solution was added slowly to the halide mixture via a pressure equalized addition funnel. The reduction was carried out under a stream of argon, with cooling as necessary. During the co-precipitation process, a black suspension was formed and hydrogen gas was evolved. The suspension was then stirred for another two hours to ensure the complete reduction of the halides. The powders were filtered and further washed several times with deoxygenated water under a stream of argon. After drying, vanadium hexacarbonyl and deoxygenated mineral oil were then added to the powder. The latter was done to ensure surface protection. The powders were stored in a Schlenk flask under argon.

EXAMPLE 5

As in Example 4, except that anhydrous chlorides of iron, molybdenum, and chromium are reduced with sodium triethylborohydride in toluene under an argon blanket to the corresponding metals.

EXAMPLE 6

A fine aerosol of $Fe(CO)_5$, containing in addition precursors yielding Cr, Mo and V, is introduced into a hot zone (500° C.) via an ultrasonic nozzle. The corresponding powders are collected on a cold finger.

Figure 3:
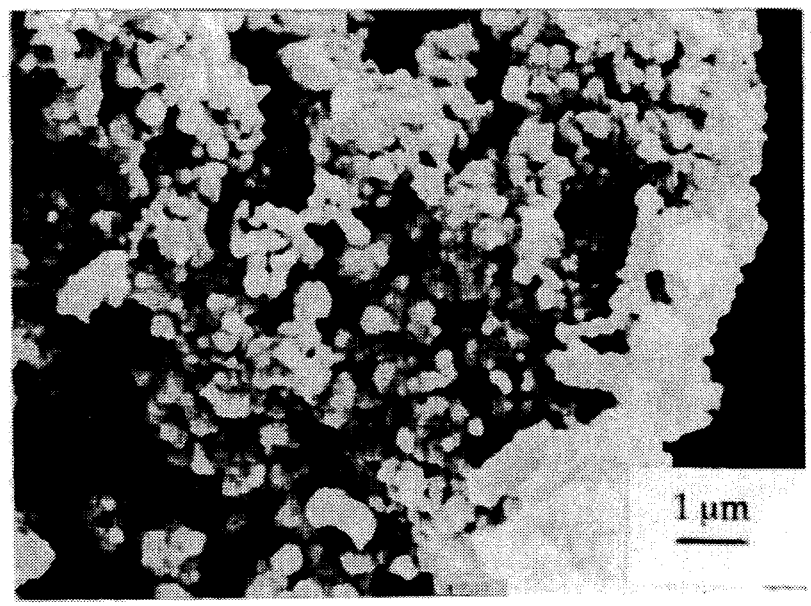
FIG. 3 is a photograph of a scanning electron microscope (SEM) view of an as-synthesized nanostructured steel alloy powder of the present invention.
Figure 4:
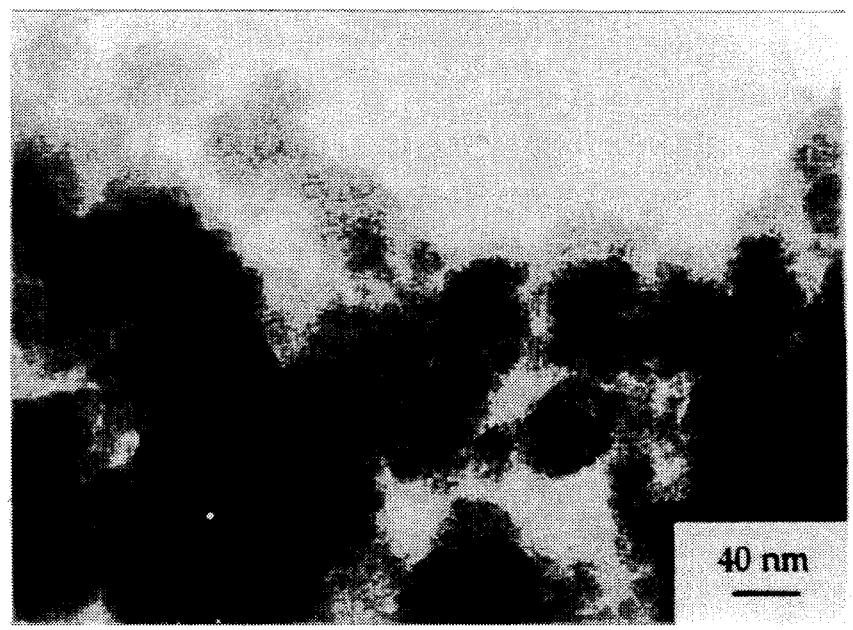
FIG. 4 is a photograph of a transmission electron microscope (TEM) view of an as-synthesized nanostructured steel powder of the present invention.

The nanostructured powders obtained from Examples 1, 2 and 4 appear as shiny black metallic particles. X-ray diffraction (XRD) analysis of the as-synthesized powders reveals peaks characteristic of amorphous materials. An SEM photograph of the powder is shown in FIG. 3 and illustrates that the powder has a porous structure, but gives no detailed information due to the very small particle size. A typical TEM micrograph of the powder is shown in FIG. 4, which reveals that these powders are nanostructured agglomerates, and each agglomerate is about 50 nm. Careful examination further reveals that these agglomerates are built-up from nanostructured particles of each about 4 nm. Both electron diffraction and HRTEM studies indicated that they are amorphous.

Elemental analysis of the powder derived from metal carbonyl precursors (Example 1) is as follows: 94.2% Fe, 0.3% Cr, 0.4% Mo, and 2.1% V. The compositional discrepancy between this composition and a typical M50 type alloy may be due to sublimation of $Cr(CO)_6$ and $MO(CO)_6$ during the decomposition process. Elemental analysis of the powder derived from metal halide starting materials (Example 4) is as follows: 87.7% Fe, 4% Cr, 4.5% Mo, and 1% V, which corresponds to the composition of commercial M50 steel.

Figure 5:
FIG. 5 is a photograph of a TEM view of a consolidated sample of a nanostructured steel alloy of the present invention.
Figure 6:
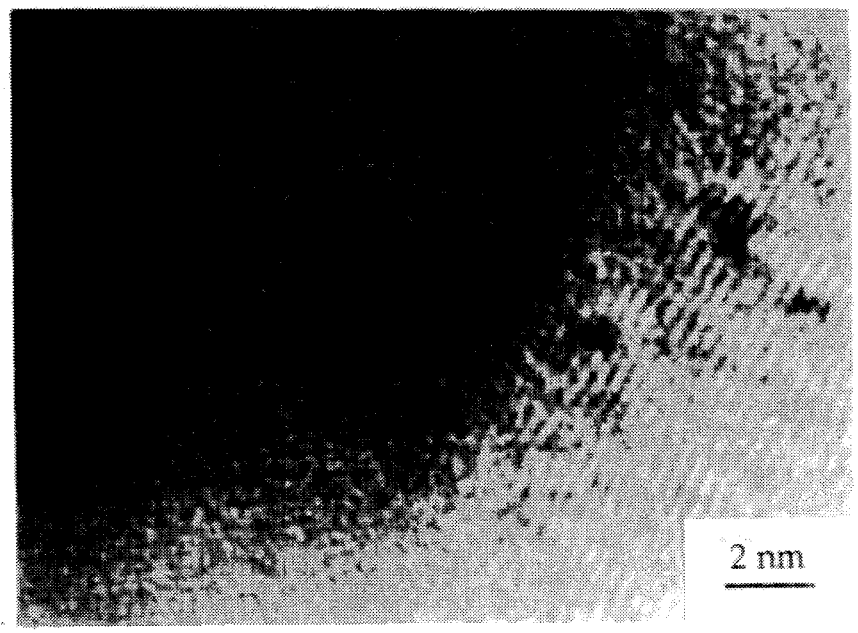
FIG. 6 is a photograph of a high resolution transmission electron microscope electron microscope (HRTEM) view of a consolidated sample of a nanostructured steel alloy of the present invention.

XRD analysis of the consolidated powders revealed the consolidated powders to be fully dense, nanostructured crystalline solids, with relatively sharp major peaks identified as $\alpha$-Fe, and minor peaks identified as a mixture of carbides. The average crystallite size calculated from the x-ray broadening analysis was about 45 nm for the powders obtained from the decomposition of carbonyls, and 70 nm for the powders obtained from the coprecipitation of the halides. A typical bright field TEM micrograph of the consolidated sample is shown in FIG. 5. It appears that there is a distribution in grain size, but the average grain size is about 50 nm. There is also a phase separation as revealed by the microstructural contrast. Electron diffraction also revealed that the alloy had a complex phase structure. A HRTEM micrograph of the consolidated sample is shown in FIG. 6. The lattice fringes seem complex and cannot be assigned to a pure iron phase. Crystalline grains as shown by the lattice fringes have an average size of about 22 nm. It was also observed that elongated nanograins existed with other more equiaxed crystallites. These elongated nanograins have, for instance, the dimension of 60 nm in length and 24 nm in width.

The nanostructured steel alloy of the present invention offers significant features and advantages over the prior art steel alloys. Nanostructured materials have improved mechanical and physical properties such as hardness, strength and durability, due to the greater homogeneity of such materials. This makes them particularly suitable for applications requiring high-quality materials, such as bearings and cutting tools. In addition, chemical synthesis of such alloys allows for greater homogeneity, control of stoichiometry, tailored synthesis and the cost-effective production of bulk amounts of materials.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A steel alloy, comprising:

nanostructured crystals comprised of iron, chromium, molybdenum, vanadium and carbon.

2. The steel alloy of claim 1, wherein:

said iron is in the range of about 80 to about 95 weight percent, said chromium is in the range of about 2 to about 8 weight percent, said molybdenum is in the range of about 2 to about 8 weight percent, said vanadium is in the range of about 1.0 to about 3.4 weight percent and said carbon is in the range of about 0.1 to about 8 weight percent of the total composition.

3. The steel alloy of claim 2, wherein:

said iron is 89.7 weight percent, said chromium is 4.0 weight percent, said molybdenum is 4.5 weight percent, said vanadium is 1.0 weight percent and said carbon is 0.8 weight percent of the total composition.

4. The steel alloy of claim 1, wherein:

said iron is 94.2 weight percent, said chromium is 0.3 weight percent, said molybdenum is 0.4 weight percent, said vanadium is 2.1 weight percent, and said carbon is 3.0 weight percent of the total composition.

5. The steel alloy of claim 1, wherein:

said nanostructured crystals are derived from compression of a nanostructured steel powder comprising said iron, chromium, molybdenum, vanadium and carbon.

6. The steel alloy of claim 5, wherein:

said iron is in the range of about 80 to about 95 weight percent, said chromium is in the range of about 2 to about 8 weight percent, said molybdenum is in the range of about 2 to about 8 weight percent, said vanadium is in the range of about 1.0 to about 3.4 weight percent and said carbon is in the range of about 0.1 to about 8 weight percent of the total composition.

7. The steel alloy of claim 6, wherein:

said iron is 89.7 weight percent, said chromium is 4.0 weight percent, said molybdenum is 4.5 weight percent, said vanadium is 1.0 weight percent and said carbon is 0.8 weight percent of the total composition.

8. The steel alloy of claim 5, wherein:

said iron is 94.2 weight percent, said chromium is 0.3 weight percent, said molybdenum is 0.4 weight percent, said vanadium is 2.1 weight percent, and said carbon is 3.0 weight percent of the total composition.

9. An article, comprising:

nanostructured steel alloy, said alloy comprising iron, chromium, molybdenum, vanadium and carbon.

10. The article of claim 9 wherein:

said iron is in the range of about 80 to about 95 weight percent, said chromium is in the range of about 2 to about 8 weight percent, said molybdenum is in the range of about 2 to about 8 weight percent, said vanadium is in the range of about 1.0 to about 3.4 weight percent and said carbon is in the range of about 0.1 to about 8 weight percent of the total composition.

11. The article of claim 10 wherein:

said iron is 89.7 weight percent, said chromium is 4.0 weight percent, said molybdenum is 4.5 weight percent, said vanadium is 1.0 weight percent and said carbon is 0.8 weight percent of the total composition.

12. The article of claim 9, wherein:

said nanostructured steel is derived from compression of a nanostructured steel powder comprising iron, chromium, molybdenum, vanadium and carbon.

13. The article of claim 12, wherein:

said iron is in the range of about 80 to about 95 weight percent, said chromium is in the range of about 2 to about 8 weight percent, said molybdenum is in the range of about 2 to about 8 weight percent, said vanadium is in the range of about 1.0 to about 3.4 weight percent and said carbon is in the range of about 0.1 to about 8 weight percent of the total composition.

14. The article of claim 13 wherein:

said iron is 89.7 weight percent, said chromium is 4.0 weight percent, said molybdenum is 4.5 weight percent, said vanadium is 1.0 weight percent and said carbon is 0.8 weight percent of the total composition.

15. The article of claim 12, wherein:

said iron is 94.2 weight percent, said chromium is 0.3 weight percent, said molybdenum is 0.4 weight percent, said vanadium is 2.1 weight percent, and said carbon is 3.0 weight percent of the total composition.

16. A bearing comprising:

nanostructured steel alloy, said alloy comprising iron, chromium, molybdenum, vanadium and carbon.

17. A cutting tool comprising:

nanostructured steel alloy, said alloy comprising iron, chromium, molybdenum, vanadium and carbon.

18. A steel powder comprising:

iron, chromium, molybdenum, vanadium and carbon, wherein, the powder is nanostructured.

19. The nanostructured steel powder of claim 18, wherein:

said iron is in the range of about 80 to about 95 weight percent, said chromium is in the range of about 2 to about 8 weight percent, said molybdenum is in the range of about 2 to about 8 weight percent, said vanadium is in the range of about 1.0 to about 3.4 weight percent and said carbon is in the range of about 0.1 to about 8 weight percent of the total composition.

20. The nanostructured steel alloy of claim 2, wherein:

said iron is 89.7 weight percent, said chromium is 4.0 weight percent, said molybdenum is 4.5 weight percent, said vanadium is 1.0 weight percent and said carbon is 0.8 weight percent of the total composition.

21. The nanostructured steel alloy of claim 1, wherein:

said iron is 94.2 weight percent, said chromium is 0.3 weight percent, said molybdenum is 0.4 weight percent, said vanadium is 2.1 weight percent, and said carbon is 3.0 weight percent of the total composition.

* * * * *

UNITED STATES PATENT AND TRADEMARK OFFICE
CERTIFICATE OF CORRECTION

PATENT NO.   : 5,589,011
DATED        : December 31, 1996
INVENTOR(S)  : Kenneth E. Gonsalves It is certified that error appears in the above-identified patent and that said Letters Patent is hereby corrected as shown below:

Column 1,
Line 3, insert -- STATEMENT REGARDING FEDERALLY SPONSORED RESEARCH AND DEVELOPMENT
   This invention was made with Government support under grants N00014-94-1-0579 and N00014-94-1-0833 awarded by the U.S. Office of Naval Research. The Government has certain rights in the invention. --

Column 2,
Line 19, after "as", delete "beatings" and insert therefor -- bearings --;
Line 31, after "bearing", delete ":" (colon) and insert therefor -- ; -- (semicolon);
Line 42, after "invention;", insert -- and --;
Line 44, after "microscope", delete "electron microscope"

Column 4,
Line 3, after "about", delete "01." and insert therefor -- 0.1 --

Signed and Sealed this

Twenty-first Day of October, 2003

JAMES E. ROGAN
*Director of the United States Patent and Trademark Office*